A. B. SMITH.
Dress-Elevators.
No. 6,184. Reissued Dec. 22, 1874.
Fig 1.
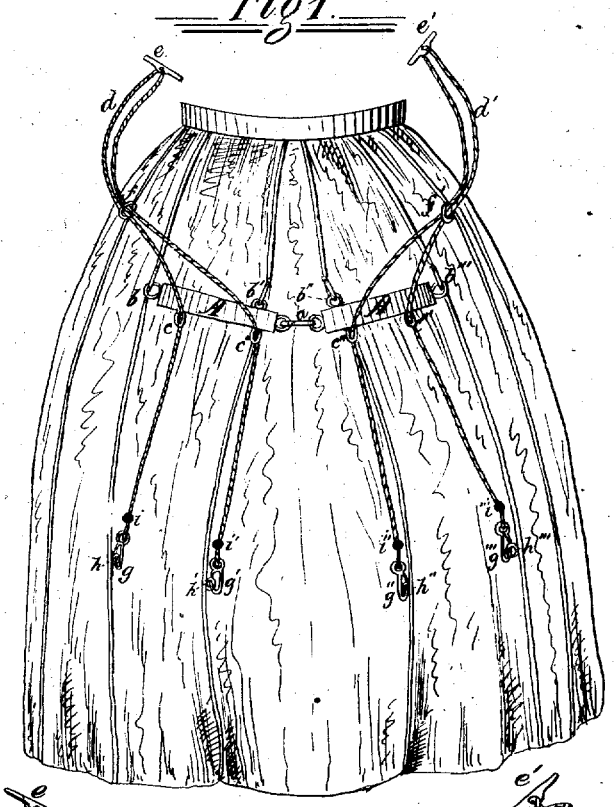
Fig 2.
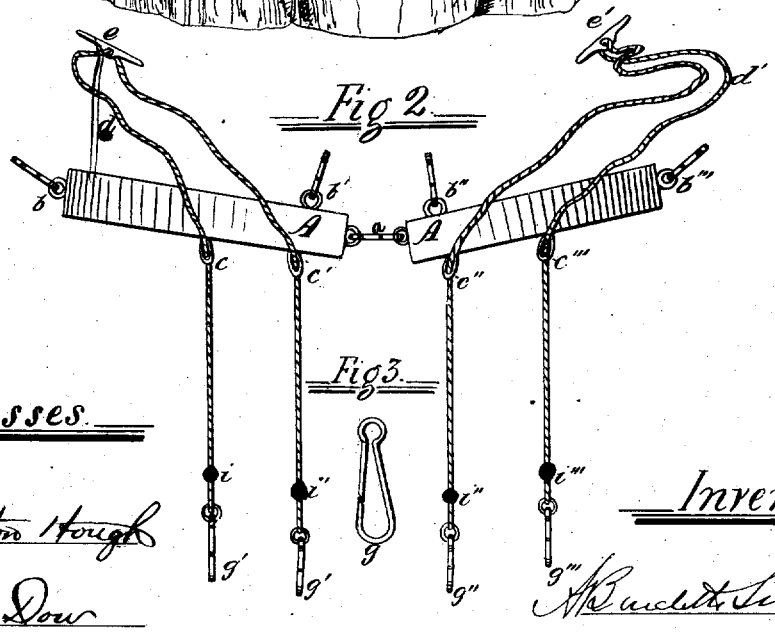
Fig 3.
Witnesses.
A. Barton Hough
Alex. Dow
Inventor.
A. Burdett Smith
THE GRAPHIC CO. PHOTO-LITH. 39 & 41 PARK PLACE, N.Y.

UNITED STATES PATENT OFFICE.

A. BURDETTE SMITH, OF NEW YORK, N. Y.

IMPROVEMENT IN DRESS-ELEVATORS.

Specification forming part of Letters Patent No. 151,515, dated June 2, 1874; reissue No. 6,184, dated December 22, 1874; application filed September 21, 1874.

*To all whom it may concern:*

Be it known that I, A. BURDETTE SMITH, of the city of New York, county of New York and State of New York, have invented an Improvement in Dress-Elevators, of which the following is a specification, reference being had to the accompanying drawings forming part hereof.

One of the chief hinderances to the satisfactory operation of dress-elevators in which cords are employed that pass through eyelets or rings attached to the waistband, or a brace connected thereto, has been the binding of the cords in the eyelets or rings, or in the folds of the dress, or at some point over which the cords run, thereby preventing the dress, after it has been raised by drawing the cords, from falling readily and quickly to its natural position when the cords are loosened. A very slight hinderance to the free movements of the cords will occasion this disagreeable result. The object of my invention is to obviate this difficulty by so constructing the elevator and forming and placing the eyes or rings through which the cords pass that the cords cannot, by pressure of the dress or its folds, or otherwise, be obstructed in their movements.

The method by which this result is secured will clearly appear from the following description of my elevator:

I first make a brace-band, consisting of the band A, in two parts, connected by a small loop-joint, *a*, though this joint is not essential. This brace-band A is composed of two or more thicknesses of cloth, and is properly stiffened, and is attached to the skirt at the seams by means of rings and snaps at the points upon the skirt corresponding to *b b′ b″ b‴* in the drawing. To this brace-band A are attached four eyes or loops, *c c′ c″ c‴*, which are so formed and attached to the brace-band A that they stand and are held edgewise to the person and the overlying folds of the skirt. These eyes or loops are made by bending the ends of a strong wire of a proper length, and which wire is fastened in the folds of the brace-band A, so that the looped ends of the wire are bent and held sidewise to the band, and cannot, by the pressure of the skirt upon them, be made to change their position or to lie down flat. In this position the cords will run freely through the loops, unobstructed by the weight of the dress.

If simple eyelets through the band were used instead of such loops, the weight of the skirt upon the cords passing through the eyelets would cause so much friction that the skirt, after being raised, would not fall by its own weight after the cords were loosened.

The two cords *d* and *d′* are each looped through the eye of a button or bar, *e e′*, the free ends of each cord passing first together through the rings *f* and *f′*, respectively, and then separately through the loops *c c′ c″ c‴*. To the ends of the two cords are attached spring-clasps *g g′ g″ g‴*, intended to fasten into the rings *h h′ h″ h‴*, that are sewed on the seams of the skirt, one on each of the seams of the rear breadths thereof.

Upon each cord may be strung large beads *i i′ i″ i‴*, to prevent the ends of the cords from being drawn through the loops *c c′ c″ c‴* when the skirt is elevated.

The rings *h h′ h″ h‴* are sewed upon the skirt at such a distance below the lower edge of the brace-band A that, when the cords are drawn up until the beads on the cords touch the loops *c c′ c″ c‴*, the dress will be raised to the desired height, and cannot be drawn too high.

The rings *f f′* may be fastened upon the under side of the skirt whenever desired; but to avoid friction of the cords passing through them, they should be placed about five inches below the waist, and at about the relative positions shown in the drawing, as here the folds of the dress will not interfere with the cords.

The upper and looped ends of the cords are intended to be brought in front of the person, and to pass through eyelets in the dress, the buttons or bars *e e′* preventing their withdrawal under the dress.

I am aware that a dress-elevator has been made and patented consisting of a bustle having eyelets or rings in its lower edge, through which pass cords, which run over the surface of the bustle, and through eyelets in the waistband. I do not claim any such thing. My brace-band A cannot be mistaken for a bustle, and does not accomplish the objects of a bustle. The cords passing over a bustle and through eyelets, as last mentioned, are liable to all the objections of friction, &c., which it is intended to obviate in the design and construction of my elevator.

What I claim is—

1. A dress-elevator formed of the brace-band A, as shown, and having the eyes or loops *c c′ c″ c‴* formed and attached so they will maintain their position edgewise to the person and overlying skirt, and the cords *d d′*, operating as specified.

2. A dress-elevator composed of the brace-band A, loops or eyes *c c′ c″ c‴*, and cords *d d′*, with the rings *f f′*, all combined and arranged substantially as and for the purpose specified.

Witness my hand this 16th day of September, A. D. 1874.

A. BURDETTE SMITH.

Witnesses:

A. BARTON HOUGH,
ALEX. DOW.